Oct. 12, 1965    A. G. CARTER    3,211,016
WHEEL ASSEMBLY FOR BAND SAWS
Filed April 2, 1962    2 Sheets-Sheet 1
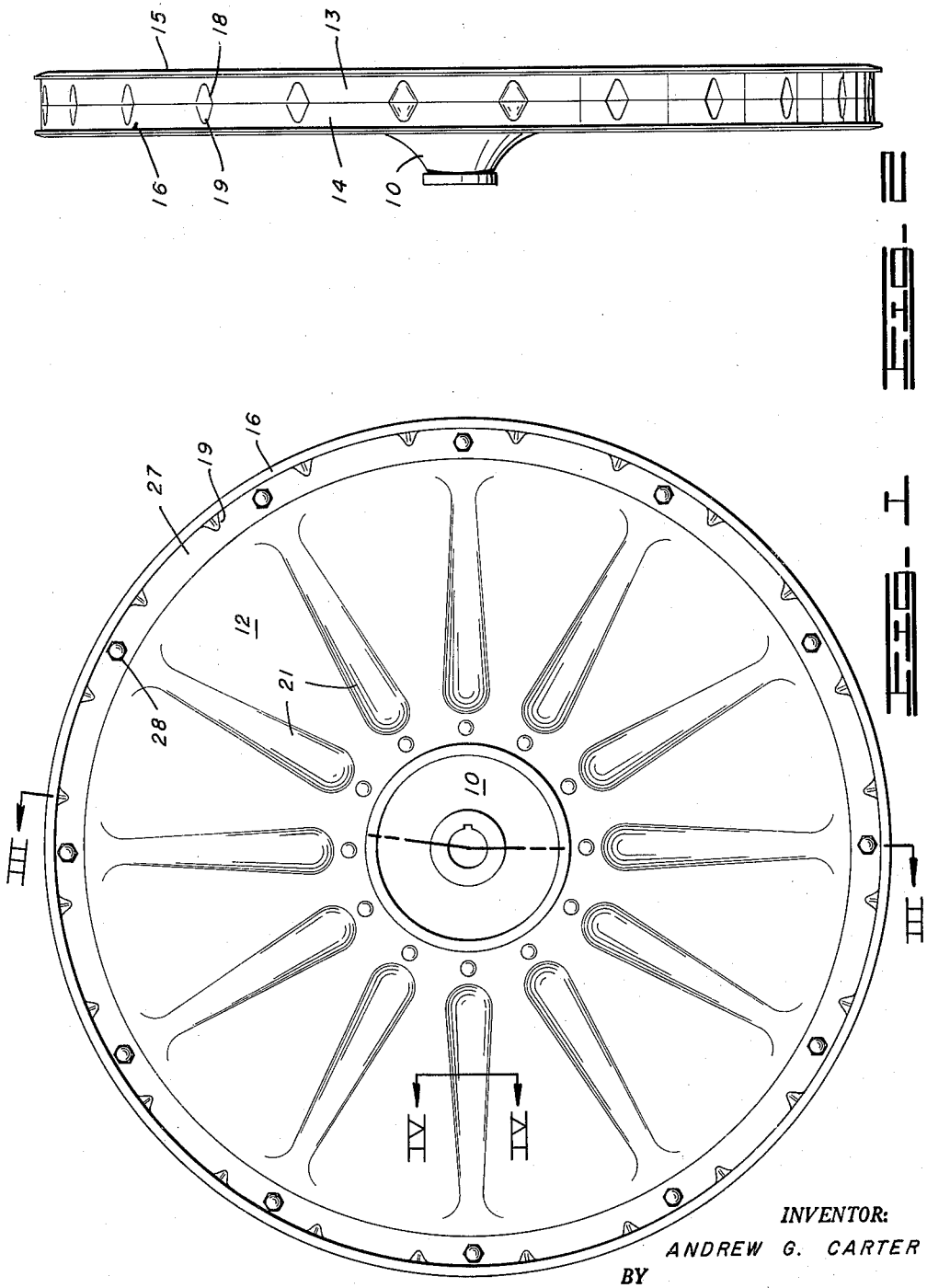
INVENTOR:
ANDREW G. CARTER
BY Oct. 12, 1965 A. G. CARTER 3,211,016
WHEEL ASSEMBLY FOR BAND SAWS
Filed April 2, 1962 2 Sheets-Sheet 2
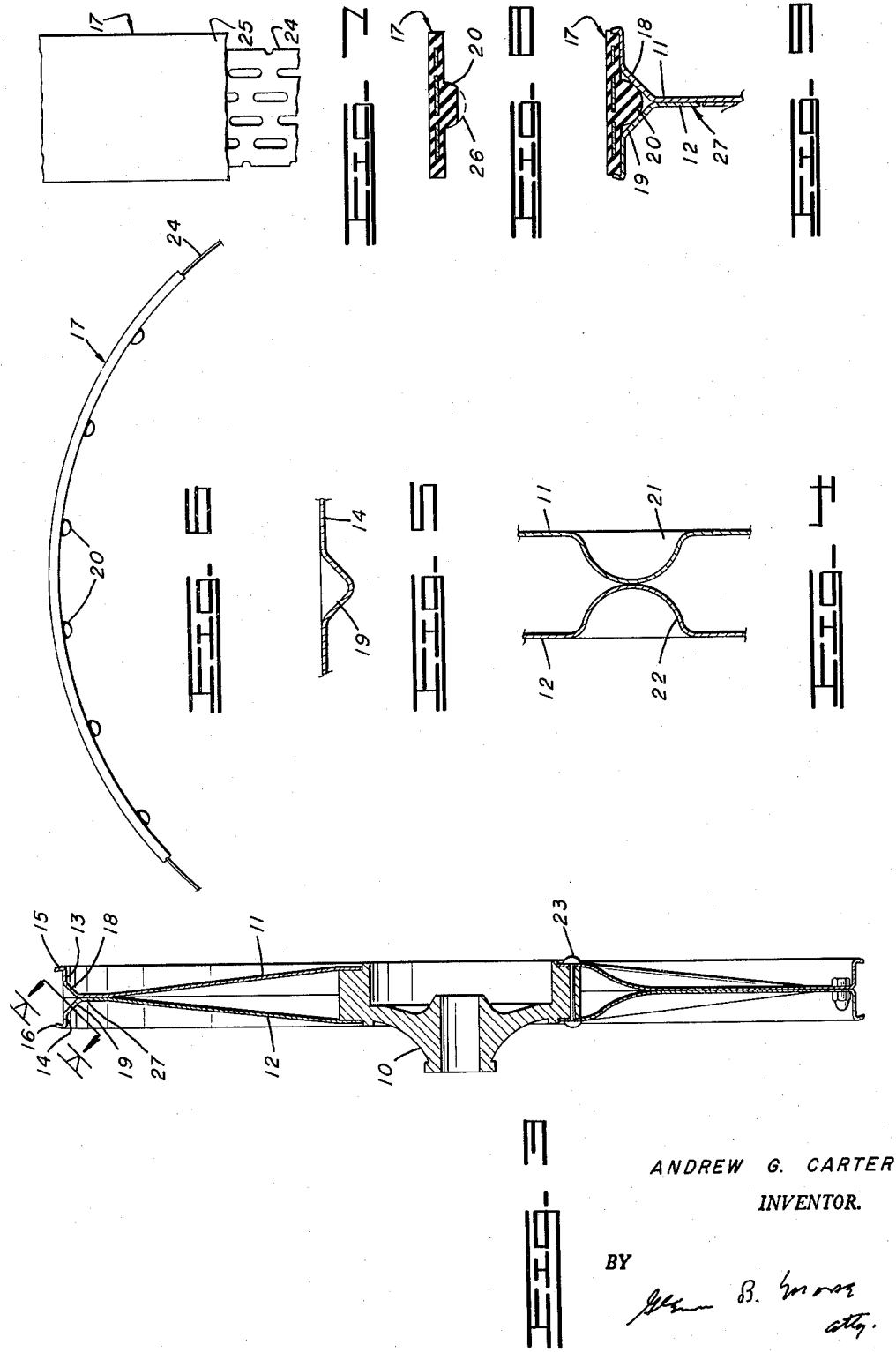
ANDREW G. CARTER
INVENTOR.

United States Patent Office 3,211,016
Patented Oct. 12, 1965

3,211,016
WHEEL ASSEMBLY FOR BAND SAWS
Andrew G. Carter, 2930 Lake Drive SE.,
Grand Rapids, Mich.
Filed Apr. 2, 1962, Ser. No. 184,317
5 Claims. (Cl. 74—230.7)

This invention has been developed primarily as a construction for band saw wheels having cored tires, and provides a solution to some very troublesome problems. The conventional band saw wheel assembly includes a metallic wheel structure and a cored tire at the outer periphery. The resilient cushion provided by a layer of rubber surrounding the metal core of the tire has the function of supporting the endless band blade, and also conventionally provides the driving friction for pulling the blade through the material cut by the machine. With greater and greater applications of power, the torque transfer between the metallic wheel structure and the tire member becomes sufficiently great that it produces a tendency for the tire to slip peripherally with respect to the remainder of the wheel, and this tendency is aggravated in any situation in which an accumulation of tolerance has resulted in a degree of looseness between the tire and the wheel. Any slipping action at the velocities normally involved will very shortly rip the tire to shreds.

It is accordingly very desirable to somehow "key" the tire member to the wheel to inhibit or prevent the peripheral slippage, and thereby remove the requirement for excessively close tolerances. The present invention provides a plurality of peripherally-spaced recesses in the rim on which the tire is mounted, with projections on the tire extending into these recesses for driving engagement. In the preferred form of the wheel structure, the metallic portion of the wheel includes a hub to which opposite sheet-metal web members are secured in spaced relationship near the hub, and are joined near the outer cylindrical portion which forms the tire-receiving rim. The recesses previously referred to are formed by discontinuities in the otherwise cylindrical peripheral rim surface, and these deformities not only provide the recesses for receiving the tire projections, but also serve as reinforcing gussets for stiffening the junction between the web and rim.

The second of the two problems referred to above relates to balance. With the use of a lathe-turned hub, and formed pieces of sheet metal as the web members secured to the hub, it is relatively easy to maintain a high degree of balance in the metallic portion of the wheel without a special balancing operation. The tire is formed by a molding procedure in which an annular core is placed in a mold as an insert. The placement of the core within the rubber molded to it, together with irregularities in the thickness of the molding material itself, will immediately present a problem in balance. It has heretofore been the practice to balance a complete assembly of wheel and tire, but this requires re-balancing every time a tire is replaced. Applicant has found that the molding of the tire with the inwardly-extending locking lugs for preventing peripheral slippage also provides a solution for the problem of balancing the tire itself independently of the wheel. A tire constructed in this manner can be placed upon a balancing fixture (which is essentially a test wheel) gripping such portions of the tire as will expose the inward projections. Certain of these may be selectively machined off to whatever extent it necessary to establish the desired degree of balance.

The several features of the invention will be analyzed in further detail through a discussion of the particular embodiments illustrated in the accompanying drawings. In the drawings:

FIGURE 1 presents a front elevation of a complete wheel assembly incorporating the present invention.

FIGURE 2 is a side elevation of the wheel shown in FIGURE 1, FIGURES 1 and 2 being in projection.

FIGURE 3 presents an axial section of the wheel shown in FIGURE 1, taken on the plane III—III of FIGURE 1.

FIGURE 4 is an enlarged section taken on the plane IV—IV of FIGURE 1.

FIGURE 5 is an enlarged sectional view taken on the plane V—V of FIGURE 3.

FIGURE 6 shows a section of a tire for installation on the wheel illustrated in FIGURES 1–5.

FIGURE 7 illustrates the construction of the tire shown in FIGURE 6, with a portion of the resilient covering material broken away to show the metallic core structure.

FIGURE 8 illustrates the manner in which portions of inward projections on the tire may be machined off for producing balance.

FIGURE 9 illustrates the engagement of the projections on the tire with the recesses in the metallic wheel structure for producing driving engagement.

Referring to the drawings, the wheel assembly includes a hub 10, and the opposite sheet metal web members 11 and 12 extending radially outward from the hub and terminating in the rim portions 13 and 14, respectively. These rim portions are respectively provided with axially-spaced flanges as shown at 15 and 16, which define between them, together with the rim portions 13 and 14, a substantially annular groove for receiving the tire 17. At a plurality of peripherally spaced points about the rim portions 13 and 14, indentations in the sheet metal are formed as shown at 18 and 19. These are opposite with respect to each other, and provide recesses for receiving the projections 20 on the tire 17 to establish a peripheral locking relationship as shown in FIGURE 9. In addition to this locking function, the portions 18 and 19 serve as gussets reinforcing the junction between the web portions 11 and 12 and the rim portions 13 and 14, respectively. As the size of saw bands handled by these wheels increases, together with the corresponding increase in tension, the bending stresses applied to the wheel structure near this point of junction become very severe. Even if not sufficient to actually exceed the bending strength of the material, the constant repetition of these stresses as the tire rotates (with each element proceeding from stressed to unstressed condition) generates a fatigue action which will ultimately weaken and crack the junction. The presence of the reinforcing gussets 18 and 19 will normally prevent the development of either excessive immediate bending stresses, or a fatigue action. This stiffening action, together with that of the deformed beads shown in FIGURE 4 at 21 and 22, will result in a relatively rigid and vibration-free wheel assembly. The web members may be secured to the hub 10 in any convenient fashion, as by a plurality of rivets 23.

Referring particularly to FIGURES 7, 8, 9, the tire indicated generally at 17 includes a perforated metallic core 24 around which resilient rubber material 25 is molded. The inward projections 20 are formed integrally during the molding procedure, and the presence of these makes it possible to balance the tire 17 independently of a wheel. A conventional balanced test wheel may be used, with the tire 17 then constituting the primary element which might be out of balance. The rim of the test wheel should preferably expose the projections 20. As the wheel assumes its natural rest position on a horizontal axis of rotation in good bearings, certain of the inward projections 20 may be machined off from the full original position so that the removal of the material shown in dotted lines in FIGURE 8 will be sufficient to restore complete balance to the tire and test wheel. This, of course, results in balancing the tire itself. The particular structural details of a test wheel are conventional and form no part of the present invention, and are not shown.

The installation and removal of the tire 17 may be provided for either through the use of a separable outer rim portion on one of the web members 11 and 12, so that the portion indicated at 27 is axially removable, or the web members 11 and 12 may be sprung apart sufficiently to admit a tire to some extent between them. This will permit the tire to be moved to an eccentric position with respect to the web members, and slipped off. With the removable rim section 27, a group of bolts 28 spaced about the periphery of the assembly will suffice to secure the components in assembled relationship. The web members 11 and 12 are then preferably spot welded or otherwise secured together inwardly of the rim section 27.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A wheel assembly, comprising:
hub means establishing an axis for said wheel assembly,
opposite web member normally secured to said hub means and extending outward with respect to said axis,
    said web members having a plurality of substantially radially-extending beads,
    said web members being in spaced relationship at said hub, and being normally secured together adjacent the outer extremity thereof,
oppositely extending rim means, including a removable portion, said rim means being normally secured to said web members at the outer extremity thereof, the junction of said rim means and web members including indented portions forming recesses in said rim means and means reinforcing said junction,
    said rim means being provided with flange means, respectively, providing with said rim means a substantially annular channel,
and tire means having a portion received on said rim means, and having projections extending inwardly and normally engaging said recesses.

2. A wheel assembly, comprising:
hub means establishing an axis for said wheel assembly,
a pair of opposite web members normally secured to said hub means and extending outward with respect to said axis,
oppositely extending rim means normally fixed with respect to said web members, one of said rim means being integral with at least one of said web members at the outer extremity thereof, the junction of said rim means and web members including indented portions forming recesses in said rim means and means reinforcing said junction,
    said rim means being provided with flange means, respectively, providing with said rim means a substantially annular channel;
and tire means having a portion received on said rim means, and having projections extending inwardly and normally engaging said recesses.

3. A wheel assembly, comprising:
hub means establishing an axis for said wheel assembly,
at least one web member normally secured to said hub means and extending outward with respect to said axis,
oppositely extending rim means normally fixed with respect to said web member, one of said rim means being integral with said web member at the outer extremity thereof, the junction of said rim means and web member including indented portions forming recesses in said rim means and means reinforcing said junction,
and tire means having a portion received on said rim means, and having projections extending inwardly and normally engaging said recesses.

4. A wheel assembly, comprising:
hub means establishing an axis for said wheel assembly;
a pair of opposite web members normally secured to said hub means and extending outward with respect to said axis;
oppositely extending rim means normally fixed with respect to said web members, respectively, at the outer extremity thereof, the junction of said rim means and web member including indented portions forming recesses in said rim means and means reinforcing said junction,
and tire means having a portion received on said rim means, and having projections extending inwardly and normally engaging said recesses.

5. A wheel assembly, comprising:
hub means establishing an axis for said wheel assembly;
at least one web member normally secured to said hub means and extending outward with respect to said axis,
oppositely extending rim means normally fixed with respect to said web member at the outer extremity thereof, the junction of said rim means and web member including indented portions forming recesses in said rim means and means reinforcing said junction,
and tire means having a portion received on said rim means, and having projections extending inwardly and normally engaging said recesses.

References Cited by the Examiner

UNITED STATES PATENTS

| | | | |
|---|---|---|---|
| 1,560,156 | 11/25 | Gair et al. | 152—384 X |
| 1,731,599 | 10/29 | Tannewitz | 74—230.7 |
| 1,765,403 | 6/30 | Carter | 74—230.7 |
| 1,811,916 | 6/31 | Carter | 74—230.7 |
| 2,673,469 | 3/54 | Carter | 74—230.7 |
| 2,697,345 | 12/54 | Currier | 73—66 |
| 2,701,971 | 2/55 | Carter et al. | 74—230.7 |
| 2,977,153 | 3/61 | Mueller | 301—97 |
| 3,002,388 | 10/61 | Bageman | 73—483 |

FOREIGN PATENTS 200,019 10/58 Austria.

DON A. WAITE, *Primary Examiner.*

WILLIAM FELDMAN, *Examiner.*